United States Patent
Turney et al.

(12) 
(10) Patent No.: US 10,522,815 B1
(45) Date of Patent: Dec. 31, 2019

(54) METHOD TO ALLEVIATE VOLTAGE DECAY

(71) Applicant: VORBECK MATERIALS CORP., Jessup, MD (US)

(72) Inventors: James Allen Turney, Silver Spring, MD (US); Roger L Aronow, Potomac, MD (US); Sea Park, Monkton, MD (US); Joseph D Roy-Mayhew, Baltimore, MD (US)

(*) Notice: Subject to any disclaimer, the term of this patent is extended or adjusted under 35 U.S.C. 154(b) by 0 days.

(21) Appl. No.: 15/627,127

(22) Filed: Jun. 19, 2017

(51) Int. Cl.
| | |
|---|---|
| *H01M 4/04* | (2006.01) |
| *H01M 4/1393* | (2010.01) |
| *H01M 4/36* | (2006.01) |
| *H01M 4/58* | (2010.01) |
| *H01M 4/62* | (2006.01) |
| *H01M 4/1397* | (2010.01) |
| *H01M 10/052* | (2010.01) |
| *H01M 4/587* | (2010.01) |
| *H01M 4/02* | (2006.01) |

(52) U.S. Cl.
CPC ....... *H01M 4/0447* (2013.01); *H01M 4/0404* (2013.01); *H01M 4/1393* (2013.01); *H01M 4/1397* (2013.01); *H01M 4/366* (2013.01); *H01M 4/587* (2013.01); *H01M 4/5815* (2013.01); *H01M 4/621* (2013.01); *H01M 10/052* (2013.01); *H01M 2004/028* (2013.01)

(58) Field of Classification Search
CPC ............. H01M 4/0447; H01M 10/052; H01M 4/0404; H01M 4/1393; H01M 4/366; H01M 4/5815; H01M 4/587; H01M 4/621; H01M 4/1397; H01M 2004/028
See application file for complete search history.

(56) References Cited

U.S. PATENT DOCUMENTS

| | | | | |
|---|---|---|---|---|
| 6,632,573 | B1* | 10/2003 | Nimon | H01M 4/06 429/199 |
| 2003/0104272 | A1* | 6/2003 | Yamaguchi | H01M 4/0445 429/137 |
| 2011/0195305 | A1* | 8/2011 | Lee | H01M 10/052 429/207 |
| 2015/0221990 | A1* | 8/2015 | Ramaswamy | H01M 10/446 205/673 |
| 2015/0221991 | A1* | 8/2015 | Ramaswamy | H01M 10/44 205/641 |

OTHER PUBLICATIONS

A. Manthirann, Y. Fu, S.-H. Chung, C. Zu, Y.-S. Su. Rechargeable Lithium-Sulfur Batteries, Chem. Rev. 2014, 114, 11751-11787.*

* cited by examiner

*Primary Examiner* — Carlos Barcena
(74) *Attorney, Agent, or Firm* — Trentice V. Bolar, Esq.

(57) ABSTRACT

In some embodiments, lithium-sulfur electrochemical cells, fabrication methods thereof, and methods useful to enable improvement of one or more performance characteristics in lithium-sulfur electrochemical cells are provided herein. In some embodiments, a method to enable improvement of one or more performance characteristics in a lithium-sulfur electrochemical cell(s) is disclosed, wherein a conductive network is formed within the lithium-sulfur electrochemical cell(s) by applying a voltage thereto for a threshold time period. The one or more performance characteristics of the lithium-sulfur electrochemical cell increase as a result of the presence of the conductive network.

18 Claims, 4 Drawing Sheets

METHOD TO ALLEVIATE VOLTAGE DECAY

BACKGROUND

The present invention relates generally to energy storage. Lithium sulfur batteries have a high theoretical capacity for storing energy. However, lithium sulfur batteries, typically, exhibit poor cycle life in part due to the solubility of intermediate species formed as S converts to $Li_2S$ during charge and discharge of the battery. These intermediates are referred to as polysulfides. During charge or discharge the dissolved polysulfides may migrate from the cathode to the anode where they can precipitate and foul the anode leading to irreversible loss of battery capacity during cycling.

Figure 1:
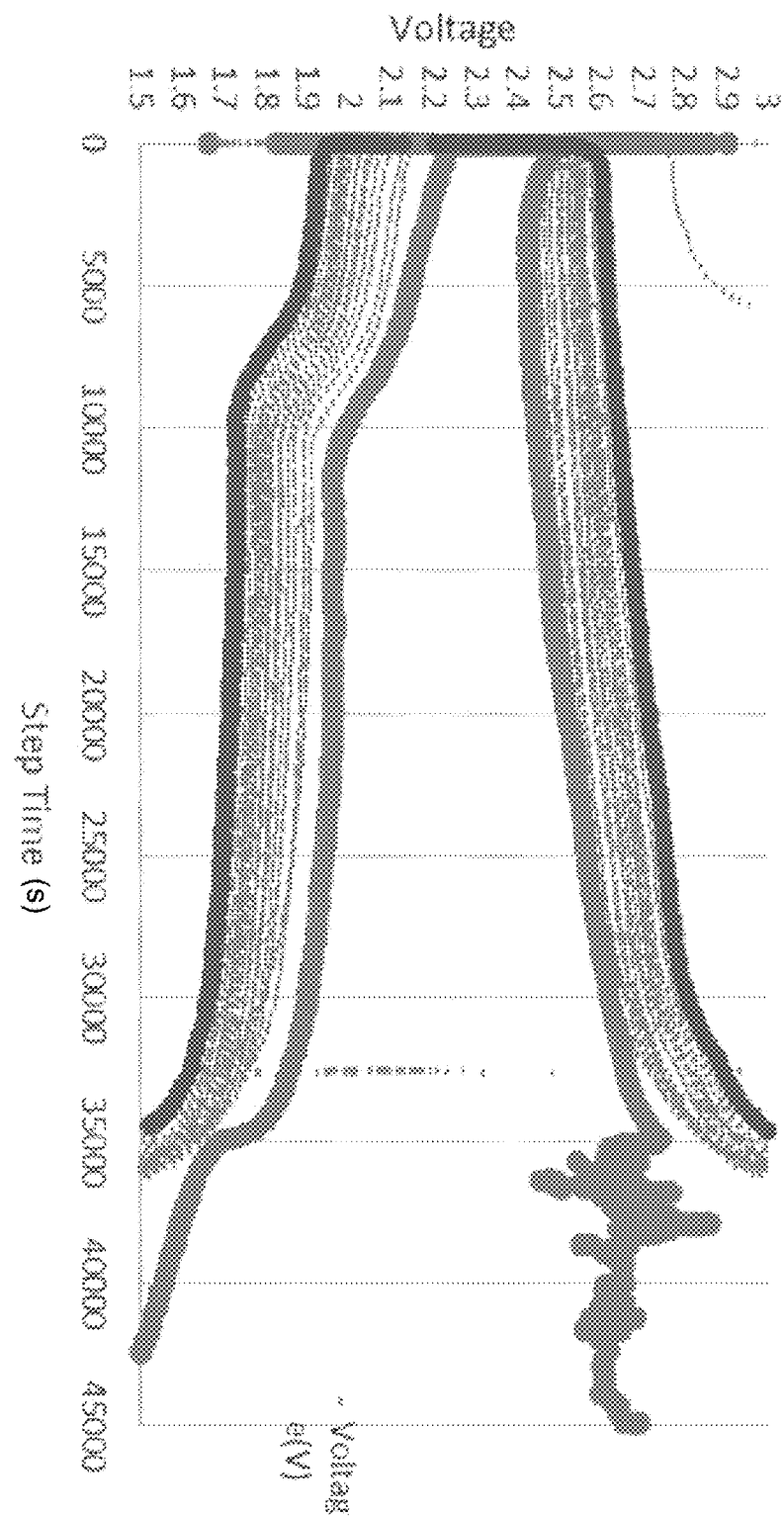
FIG. 1 illustrates a voltage-step time chart for a Li—S battery performance, in accordance with certain embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, methods and apparati are provided herein useful to enable improvement of performance characteristics of lithium-sulfur electrochemical cells. In some embodiments, lithium-sulfur electrochemical cells, fabrication methods thereof, and methods useful to enable improvement of one or more performance characteristics in lithium-sulfur electrochemical cells are provided herein. Some of these methods include forming a conductive network(s) within each of the lithium-sulfur electrochemical cells by applying a voltage(s) to each of the lithium-sulfur electrochemical cells for a threshold time period(s). One or more performance characteristics of each of the lithium-sulfur electrochemical cells can increase as a result of the presence of the conductive network(s).

In some embodiments, methods are provided for forming at least one lithium-sulfur electrochemical cell. Some of these methods include forming one or more first half-cells each having a first electrode and a first electrolyte. One or more second half-cells can be formed each having a second electrode and a second electrolyte. One or more conductive paths can be formed between one of the first half-cells and one of the second half cells. One or more voltages can be applied to each of the electrochemical cells for at least one threshold time period and thereby form a conductive network(s) within each of the electrochemical cells. The conductive network(s) can be coupled to one of the first electrodes and the second electrodes. One or more performance characteristics of one or more of the electrochemical cells can increase as a result of the presence of the conductive network(s).

Lithium sulfur ("Li—S") batteries may be pursued as an alternative to lithium-ion (Li-ion) batteries due to their have a high theoretical capacity for storing energy compared to Li-ion batteries. For example, Li—S can hold up to four times as much energy per unit mass as Li-ion batteries. Li—S batteries typically operate by reduction of sulfur during discharge to form insoluble lithium polysulfides with different chain lengths. However, polysulfide formation can result in undesirable capacity degradation. The poor cycle life of Li—S batteries typically originates from the formation of insoluble intermediate discharge products, a series of polysulfides $Li_2S_x$ (wherein x>2), which can diffuse to the lithium-containing anode and participate in, for example, sulfur shuttle mechanism reactions. For example, the undesirable shuttle effect can lead to a reduced charge-discharge efficiency and precipitation of insoluble/insulating $Li_2S_2$/$Li_2S$ on lithium-containing anodes, causing the loss of energy-bearing materials.

Similar precipitation of highly insulating $Li_2S_2$/$Li_2S$ can also occur on the cathode at deep discharge, which may lead to a largely increased overpotential (i.e., the potential difference (voltage) between a half-reaction's thermodynamically determined reduction potential and the potential at which the redox event is experimentally observed), low Coulombic efficiency, as well as irreversible capacity loss. One or more of the aforementioned detrimental effects can result in a shortened lifespan of Li—S batteries (e.g., an inability or reduced capacity to hold a charge). Sulfur is an electrical insulator and typically requires with the addition of an electronic conductor, such as a conductive carbon material, to make a composite electrode. While the conductive carbon material may increase conductivity, the material typically is a poor contributor to the capacity of the battery to store charge. Use of the carbon material typically increases the mass of the device; as a result, the increased mass may reduce the specific energy capacity of the device. The ability to charge and discharge at high rates can require a significant mass fraction of the electrode to be composed of the conductive additive, which can result in deleterious effects on the apparent charge density.

Additionally, Li—S batteries can exhibit a reduced cycle life due to the solubility of, and volume change associate with the intermediate species that may be formed as S converts to $Li_2S$ during charge and discharge of the battery. These intermediate species are referred to as polysulfides. During charge or discharge the dissolved polysulfides may migrate from the cathode to the anode where they can precipitate and theoretically foul the anode leading to a reduction of battery capacity during cycling. At times, Li—S batteries can experience voltage decay within a few cycles (e.g., in as little as 10 cycles), which can degrade battery performance, as depicted in FIG. 1. Specifically, FIG. 1 depicts a voltage-steptime chart for a LiS battery, and reflects data corresponding to the first cycle and the last cycle. Here, the plateau curves correspond to discharge and the upper arc corresponds to charge. The chart reflects a voltage degradation during of the LiS battery during discharge from cycle to cycle.

Figure 2:
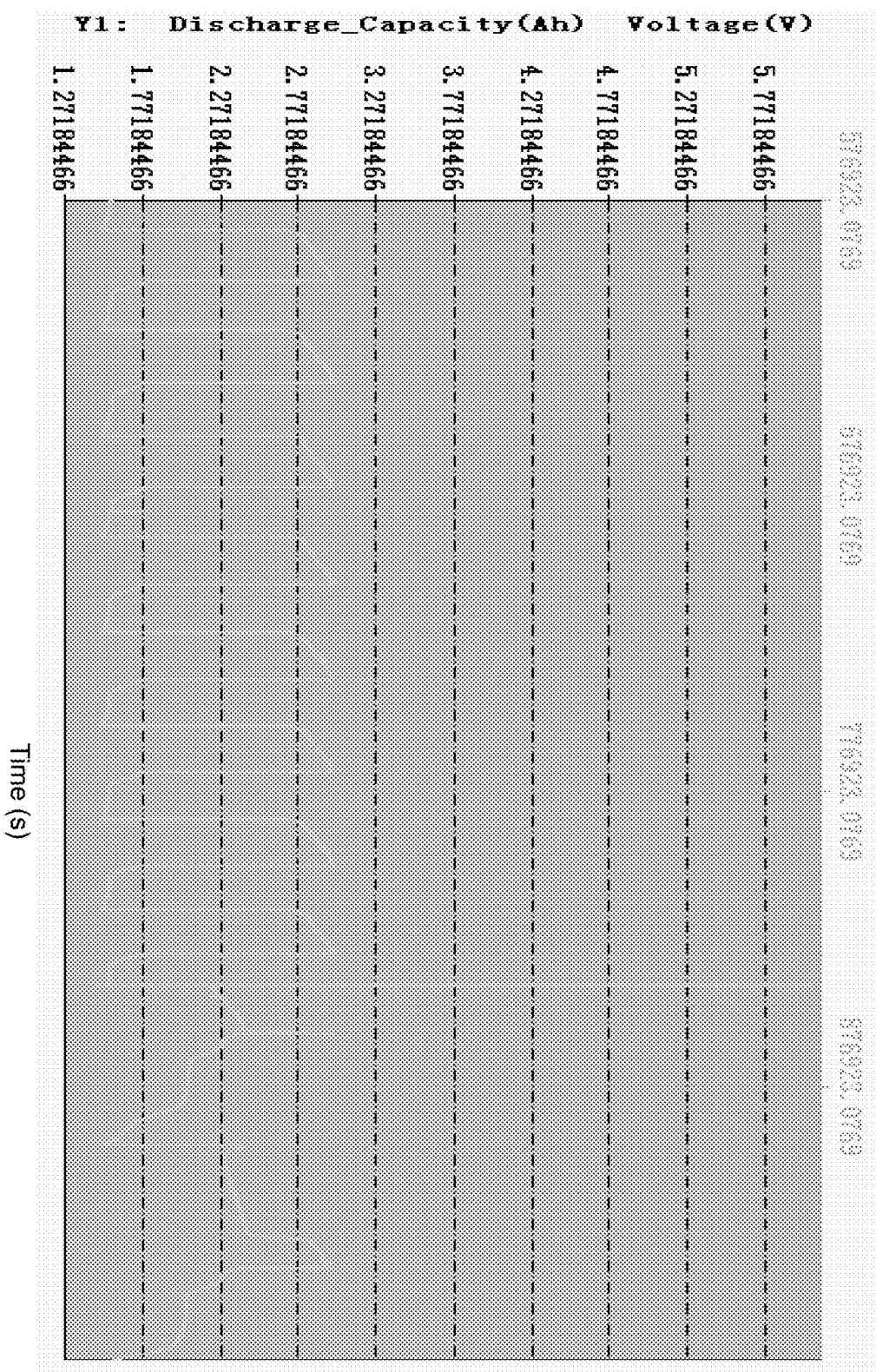
FIG. 2 illustrates a voltage-step time chart for a Li—S battery that received a voltage pulse, in accordance with certain embodiments of these teachings.

The analysis depicted in FIGS. 1 and 2 reflect the average values of a test conducted in triplicate. The LiS battery includes a current collector formed using a lithium sulfur cathode aqueous slurry that include 64% sulfur, 26% graphene (e.g., single sheets of fully exfoliated graphene), and 10% binder. The current collector also includes aluminum expanded foil having a density of 5.24 mg/cm$^2$. The current collector was formed by adding cathode slurry to both sides of the foil and reducing the moisture content of the slurry by applying pressure (e.g., up to 5,000 psi using a Carver press) and heat (e.g., up to 80° C.).

Some embodiments of these teachings seek to provide a method for reducing the occurrence of the aforementioned voltage decay. Sulfur carbon composite films on electrodes can exhibit poor adhesion and cohesion and are considered an inferior solution compared to some embodiments of these teachings. As stated above, during cycling, S converts to Li polysulfides, which may dissolve and result in a porous carbon shell, potentially destabilizing the structure. Further, during the discharge of a lithium-sulfur battery, a major product is lithium-sulfide ($Li_2S$) which is typically insoluble in the electrolyte solvent and can precipitate at the cathode-electrolyte interface. For example, when a mole of $S_{8(s)}$ completely coverts to $Li_2S_{(s)}$, it can occupy 80% more volume.

The cathode system can accommodate the volume increase by decreasing the pore space, increasing the total volume of the electrode which can results in a higher value of porosity. Also depending on the mechanical stability of the cathode microstructure, this precipitation induced volume expansion can give rise to significant stress and fracture of the cathode substrate. Subsequent detachment of the ruptured cathode microstructure from the conducting network can deteriorate the overall capacity of the lithium-sulfur cell. Even more, the insoluble $Li_2S$, the material, which now occupies an increased volume, can redeposit onto the carbonaceous electrode structure, which can further strain the structure.

This process can degrade the integrity of the conductive carbon network potentially creating gaps between the conductive particles or coating them with insulating species, which may result in increased internal resistances and a reduced discharge voltage (increasing cell charge voltage). In some embodiments, the high voltage pulses in accordance with these teachings can create and/or retain a conductive network of insoluble binding species such as through the oxidation of resistive intermediates (e.g., electrolyte in between the gap or binder, etc.), thereby creating a conductive network of insoluble binding species. High voltage pulses of some embodiments, of these teachings can be used as a formation step to improve battery cycling from its initial discharge phase or it can be used to revive poorly functioning cells.

FIG. 2 depicts a voltage-step time chart for the Li—S battery of FIG. 1 subsequent to receiving a voltage pulse in accordance with some embodiments of these teachings. The chart illustrates the voltage decay for the Li—S battery. At cycle 9, a 6 volt pulse was applied for 0.05 seconds, which restored the discharge voltage to above 2.3 volts. By one approach, the voltage pulse can be applied after complete discharge, during discharge, complete charge, during charging of the rechargeable battery cell, or a combination of two or more thereof. In some embodiments, the voltage pulse can be applied to the battery at the start of the battery life cycle (e.g., to extend the life cycle). In some embodiments, the voltage pulse can be applied at the end of the battery's life cycle (e.g., to increase functionality and extend battery life). These results run counter to conventional electrochemical theory, where the application of high voltage pulses is thought to adversely impact battery functionality (e.g., high voltage pulses can result in cell damage, electrolyte escape, decrease in battery functionality, and/or thermal runaway.

In some embodiments, the magnitude of the voltage pulse can range from about 3.5 volts to about 4.5 volts, about 4.5 volts to about 5.5 volts, about 5.5 volts to about 6.5 volts, about 6.5 volts to about 7.5 volts, about 7.5 volts to about 8.5 volts, about 8.5 volts to about 9.5 volts, about 9.5 volts to about 10.5 volts, about 10.5 volts to about 11.5 volts, about 11.5 volts to about 12.5 volts, about 12.5 volts to about 13.5 volts, about 13.5 volts to about 14.5 volts, about 14.5 volts to about 15.5 volts, about 15.5 volts to about 16.5 volts, about 16.5 volts to about 17.5 volts, about 17.5 volts to about 18.5 volts, about 18.5 volts to about 19.5 volts, about 19.5 volts to about 20.5 volts, as well as any value or sub-value or range of values thereof.

In some embodiments, the voltage can be applied to the battery from about 1 µs to about 1,000 µs, about 1,000 µs to about 100,000 µs, 100,000 µs to about 1,000 ms, about 1,000 ms to about 60 s, about 1 min to about 2 min, about 2 min to about 3 min, about 3 min to about 4 min, about 4 min to about 5 min, about 5 min to about 6 min, about 6 min to about 7 min, about 7 min to about 8 min, about 8 min to about 9 min, about 9 min to about 10 min, as well as any value, sub-value, or range of values thereof.

By one approach, the insoluble binding species can be derived from components of the cell, such as binders, the carbonaceous material (e.g., graphene, graphite, carbon nanotubes, carbon black, similar carbonaceous materials, or a combination of two or more thereof), organic structures, electrolyte solvents, electrolyte salts, or a combination of two or more thereof. In some embodiments, the insoluble binding species can be formed in-situ from 1,3-dioxalane containing electrolyte, 1,2 dimethoxyethane, a lithium nitrate salt, a bis(trifluoromethane)sulfonamide lithium salt, a PVDF latex binder, sulfur, or a combination of two or more thereof. During operation of cells at elevated voltages (e.g. 3.5-20.5 V), cell components are typically not stable. For example, such cell components can include, but are not limited to, solvents, salts, binders, conductive additives, and/or the polysulfide species. Without being limited, held, or bound to any particular theory or mechanism, Applicant believes that the breakdown of one or more of the aforementioned components may increase the number of conductive paths and lower the resistance of the cell.

In applying a high V, electrons can be extracted from the cathode, potentially oxidizing the cathode or electrolyte in electrical contact with the cathode. Theoretically, the single bonded ring structure of the dioxolane solvent, or interface layer that can be formed by its decomposition on the electrode, may be oxidized, bringing double bonds, and aromaticity into its structure. Electrons can move much more freely in such a structure and interact with the electrons in the graphene conductive support structure, thereby reducing resistance and improving the voltage in this system. This added conductive region can also act as reaction sites for the polysulfide reactions improving the effective surface area available for the reaction, which can reduce the aforementioned expansion strain and improve S utilization and mechanical integrity.

In some embodiments, the voltage pulse can improve absolute V from about 0.25 volts to about 0.5 volts, about 0.5 volts to about 0.75 volts, about 0.75 volts to about 1 volt, about 1.0 volts to about 1.25 volts, about 1.25 volts to about 1.5 volts, about 1.5 volts to about 1.75 volts, about 1.75 volts to about 2 volt, about 2.0 volts to about 2.25 volts, about 2.25 volts to about 2.5 volts, about 2.5 volts to about 2.75 volts, about 2.75 volts to about 3 volts, as well as any value, sub-value, or range of values thereof.

In some embodiments, the voltage pulse can result in an increase in the energy density of the battery cell from about 5% to about 10%, about 10% to about 15%, about 15% to about 20%, about 20% to about 25%, about 25% to about 30%, as well as any value, sub-value, or range of values thereof.

Figure 3:
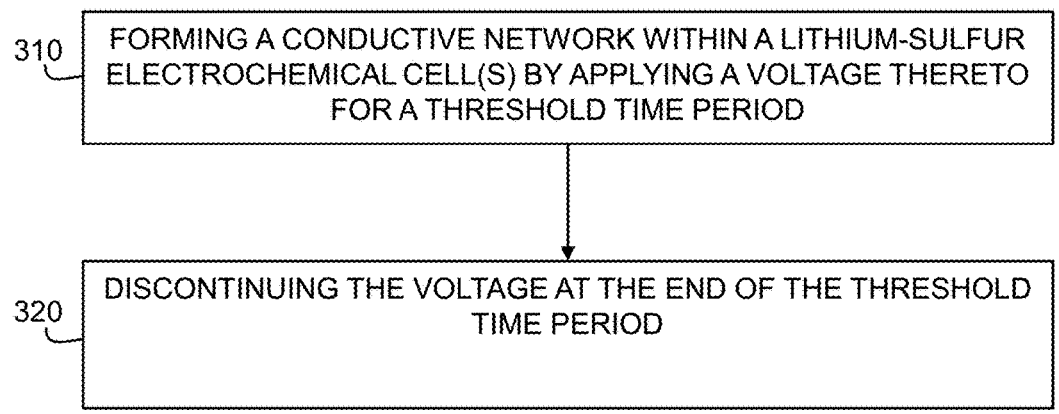
FIG. 3 comprises a flow diagram as configured, in accordance with various embodiments of these teachings.

FIG. 3 illustrates a flow diagram as configured in accordance with various embodiments of these teachings. Specifically, FIG. 3 illustrates the operational steps to enable improvement of one or more performance characteristics in one or more lithium-sulfur electrochemical cells. At block 310, a conductive network can be formed within the lithium-sulfur electrochemical cell(s) by applying at least one voltage thereto for one or more threshold time periods. At block 320, the voltage can be discontinued at the conclusion of the threshold time period. The performance characteristic(s) of the lithium-sulfur electrochemical cell(s) can increases as a result of the presence of the conductive network.

Figure 4:
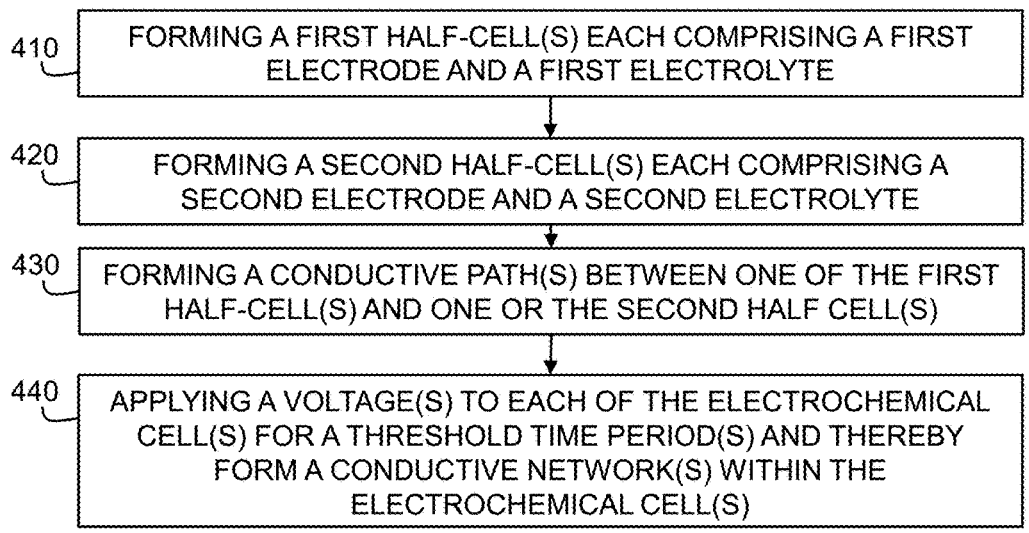
FIG. 4 comprises a flow diagram as configured, in accordance with various embodiments of these teachings.

FIG. 4 illustrates a flow diagram as configured in accordance with various embodiments of these teachings. In particular, FIG. 4 illustrates the operational steps to enable the formation of one or more lithium-sulfur electrochemical cells. At block 410, at least one first half-cell can be formed comprising a first electrode and a first electrolyte. At block 420, at least one second half-cell can be formed comprising a second electrode and a second electrolyte. At block 430, one or more conductive paths can be formed between the first half-cell and the second half cell. At block 440, one or more voltages can be applied to each of the electrochemical cells for at least one threshold time period and thereby form at least one conductive network within each of the electrochemical cells. Each of the conductive networks can be coupled to at least one of the first electrode and the second electrode. Performance characteristic(s) of each of the electrochemical cells can increase as a result of the presence of the conductive network(s).

As various modifications could be made in the constructions and methods herein described and illustrated without departing from the scope of the invention, it is intended that all matter contained in the foregoing description or shown in the accompanying drawings shall be interpreted as illustrative rather than limiting. Thus the breadth and scope of the present invention should not be limited by any of the above-described exemplary embodiments, but should be defined only in accordance with the following claims appended hereto and their equivalents.

What is claimed is:

1. A method to enable improvement of a performance characteristic in a lithium-sulfur electrochemical cell, the method comprising:
   forming a conductive network within the lithium-sulfur electrochemical cell by applying a voltage thereto for a threshold time period; and
   wherein
      a performance characteristic of the lithium-sulfur electrochemical cell increases as a result of the presence of the conductive network; and
      the voltage magnitude is about 3.5 volts to about 20.5 volts.

2. The method of claim 1, wherein
   forming the conductive network comprises forming a conductive network of insoluble species derived from the lithium-sulfur electrochemical cell.

3. The method of claim 2, wherein the insoluble binding component comprises one or more of a binder, a carbonaceous material, an organic structure, an electrolyte solvent, and an electrolyte salt.

4. The method of claim 2, wherein the insoluble binding component comprises at least one of a 1,3-dioxolane containing electrolyte, 1,2 dimethoxyethane, a lithium nitrate salt, a bis(trifluoromethane)sulfonamide lithium salt, a polyvinylidene fluoride binder, and sulfur.

5. The method of claim 1, wherein the threshold time period is about 1 µs to about 10 min.

6. The method of claim 1, wherein the performance characteristic comprises at least one of a charge capacity and an energy density.

7. The method of claim 1, wherein
   the performance characteristic comprises energy density; and
   the energy density increases by at least 15% to 20%.

8. The method of claim 1, wherein the voltage is applied after complete discharge, during charging, after full discharge, and/or during charging of the lithium-sulfur electrochemical cell.

9. A method for forming a lithium-sulfur electrochemical cell comprising:
   forming a first half-cell comprising a first electrode and a first electrolyte;
   forming a second half-cell comprising a second electrode and a second electrolyte;
   forming a conductive path between the first half-cell and the second half cell;
   applying a voltage to the electrochemical cell for a threshold time period and thereby form a conductive network within the electrochemical cell, the conductive network coupled to at least one of the first electrode and the second electrode; and
   wherein
      a performance characteristic of the electrochemical cell increases as a result of the presence of the conductive network;
      the voltage magnitude is about 3.5 volts to about 20.5 volts.

10. The method of claim 9, further comprising forming at least one of the first electrode and the second electrode by
    applying a slurry to a substrate, the slurry comprising a sulfur-coated carbonaceous material; and
    removing a threshold amount of moisture from the slurry.

11. The method of claim 10, wherein the substrate comprises at least one of a foil, a mesh, and an expanded foil.

12. The method of claim 10, wherein the sulfur-coated carbonaceous material comprises fully exfoliated single sheets of graphene.

13. The method of claim 10, wherein the slurry also comprise sulfur, fully exfoliated single sheets of graphene, and a binder.

14. The method of claim 9, wherein forming the conductive network comprises forming conductive network of insoluble species derived from the lithium-sulfur electrochemical cell.

15. The method of claim 14, wherein the insoluble binding component comprises at least one of a polymeric binder, a carbonaceous material, an organic structure, an electrolyte solvent, an electrolyte salt, a 1,3-dioxolane containing electrolyte, 1,2 dimethoxyethane, a lithium nitrate salt, a bis(trifluoromethane)sulfonamide lithium salt, a polyvinylidene fluoride binder, and sulfur.

16. The method of claim 9, wherein the threshold time period is about 1 μs to about 10 min.

17. The method of claim 9, wherein
the performance characteristic comprises energy density; and
the energy density increases by at least 20% to 25%.

18. A lithium-sulfur electrochemical cell generated using the method of claim 1.

* * * * *